(12) United States Patent
Shin et al.

(10) Patent No.: US 11,989,347 B2
(45) Date of Patent: May 21, 2024

(54) HAPTIC GLOVE APPARATUS AND VIRTUAL REALITY APPARATUS INCLUDING THE SAME

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Bongsu Shin, Seoul (KR); Jesung Koh, Suwon-si (KR); Hongseok Lee, Seoul (KR); Dongjin Kim, Suwon-si (KR); Baekgyeom Kim, Suwon-si (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 232 days.

(21) Appl. No.: 17/528,509

(22) Filed: Nov. 17, 2021

(65) Prior Publication Data
US 2022/0155870 A1    May 19, 2022

(30) Foreign Application Priority Data

Nov. 18, 2020 (KR) .................. 10-2020-0154352
Apr. 2, 2021 (KR) .................. 10-2021-0043509

(51) Int. Cl.
*G06F 3/01* (2006.01)
*A41D 19/00* (2006.01)

(52) U.S. Cl.
CPC .......... *G06F 3/016* (2013.01); *A41D 19/0024* (2013.01); *G06F 3/014* (2013.01)

(58) Field of Classification Search
CPC .......... G06F 3/016; G06F 3/014; G06F 1/163; G06F 2203/014; G06F 3/011; G06F 3/017; G06F 3/0482; A41D 19/0024
See application file for complete search history.

(56) References Cited

U.S. PATENT DOCUMENTS 10,055,022 B2 *   8/2018  Appleyard .............. G06F 3/014
10,345,910 B1 *   7/2019  Khoshkava .......... H10N 30/886
(Continued)

FOREIGN PATENT DOCUMENTS

KR    10-1626375 B1   6/2016
WO    2020/056271 A1  3/2020

OTHER PUBLICATIONS

Mammano et al., "Modelling, simulation and characterization of a linear shape memory actuator with compliant bow-like architecture", Journal of Intelligent Material Systems and Structures, vol. 26, 6, DOI: 10.1177/1045389X14560359, 2014, 12 pages total.
(Continued)

*Primary Examiner* — William Lu
(74) *Attorney, Agent, or Firm* — Sughrue Mion, PLLC

(57) ABSTRACT

There is provided a haptic glove apparatus including a glove-shaped base portion and at least one actuator disposed on the base portion. The at least one actuator includes a driving force applying portion extending in a first direction and expanding or contracting in the first direction, and an elastic support portion disposed to surround the driving force applying portion and expanding or contracting in a second direction perpendicular to the first direction according to the expansion or the contraction of the driving force applying portion.

24 Claims, 18 Drawing Sheets

(56) References Cited

U.S. PATENT DOCUMENTS

| | | | | |
|---|---|---|---|---|
| 10,481,688 | B1* | 11/2019 | Wang | G06F 3/014 |
| 10,517,535 | B2* | 12/2019 | Min | A61B 5/02055 |
| 10,642,356 | B1* | 5/2020 | Wang | G06F 3/014 |
| 10,782,782 | B1* | 9/2020 | DeSalvo | G06T 19/006 |
| 10,824,238 | B2* | 11/2020 | Kramer | G06V 20/64 |
| 11,009,959 | B1* | 5/2021 | Piazza | G02B 27/0172 |
| 11,194,397 | B1* | 12/2021 | Shin | H10N 30/88 |
| 11,467,669 | B2* | 10/2022 | Liu | G06F 3/044 |
| 11,490,669 | B1* | 11/2022 | Liu | A41D 19/01588 |
| 11,614,570 | B1* | 3/2023 | Smyth | G02B 7/12 359/665 |
| 2003/0028248 | A1* | 2/2003 | Shahinpoor | A61F 9/0017 623/905 |
| 2007/0243810 | A1* | 10/2007 | Browne | B60H 1/3421 454/155 |
| 2012/0182135 | A1 | 7/2012 | Kusuura | |
| 2015/0296907 | A1* | 10/2015 | Henderson | B62K 23/02 74/502.2 |
| 2016/0363997 | A1 | 12/2016 | Black et al. | |
| 2017/0131770 | A1* | 5/2017 | Keller | G06F 3/011 |
| 2017/0168576 | A1* | 6/2017 | Keller | G06F 3/014 |
| 2017/0173458 | A1 | 6/2017 | Billington et al. | |
| 2018/0356888 | A1* | 12/2018 | Rihn | G01L 5/103 |
| 2019/0094965 | A1 | 3/2019 | Buchanan | |
| 2019/0384395 | A1* | 12/2019 | Khoshkava | B06B 1/0238 |
| 2020/0103966 | A1* | 4/2020 | Khoshkava | G06F 3/038 |
| 2020/0183493 | A1* | 6/2020 | Lin | G06F 3/014 |
| 2021/0081048 | A1* | 3/2021 | Sedal | G06F 3/016 |
| 2021/0096649 | A1* | 4/2021 | Mok | G06F 3/016 |
| 2021/0316446 | A1* | 10/2021 | Leroy | G06F 3/014 |
| 2022/0083138 | A1* | 3/2022 | Mok | G06F 3/016 |

OTHER PUBLICATIONS

Jadhav et al., "Soft robotic glove for kinesthetic haptic feedback in virtual reality environments", IS&T International Symposium on Electronic Imaging, The Engineering Reality of Virtual Reality, Society for Imaging Science and Technology, 2017, 6 pages total.

* cited by examiner

HAPTIC GLOVE APPARATUS AND VIRTUAL REALITY APPARATUS INCLUDING THE SAME

CROSS-REFERENCE TO RELATED APPLICATIONS

This application is based on and claims priority under 35 U.S.C. § 119 to Korean Patent Application Nos. 10-2020-0154352, filed on Nov. 18, 2020, and 10-2021-0043509, filed on Apr. 2, 2021, in the Korean Intellectual Property Office, the disclosures of which are incorporated by reference herein in their entirety.

BACKGROUND

1. Field

The disclosure relates to haptic glove apparatuses and virtual reality apparatuses including the same. More particularly, the disclosure relates to virtual reality apparatuses for experiencing virtual reality content by using a haptic glove apparatus.

2. Description of the Related Art

With the advances in hardware performance, virtual reality technology has been actively studied. Hardware products that may support a variety of virtual reality services have been developed, ranging from low-cost products to products that use more complex functions, and consumer demand for such hardware products is constantly increasing. In general, virtual reality technologies use client computing devices, such as smart phones, mobile electronic devices, or s mobile computing devices (MCDs) as main components, or the virtual reality technologies may use host computing devices for providing a virtual reality experience.

Virtual reality apparatuses supporting virtual reality services may include various electronic devices according to the five senses of a user. Virtual reality apparatuses may include head mounted display (HMD) devices, virtual reality headsets (VRHs) for vision, or glove apparatuses or other wearable apparatuses using a haptic function in relation to the sense of touch.

In general, the sense of touch perceived by a user may include various pressures and various degrees of freedom. Accordingly, an actuator for realizing the sense of touch perceived by a user has a complex structure, and accordingly, the actuator is large and consumes excessive power.

SUMMARY

Provided are haptic glove apparatuses including miniaturized actuators and virtual reality apparatuses including the haptic glove apparatuses.

In addition, provided are haptic glove apparatuses including actuators capable of applying various pressures and virtual reality apparatuses including the haptic glove apparatuses.

In addition, provided are haptic glove apparatuses implementing various senses of touch and virtual reality apparatuses including the haptic glove apparatuses.

Additional aspects will be set forth in part in the description which follows and, in part, will be apparent from the description, or may be learned by practice of the presented embodiments of the disclosure.

According to an aspect of the disclosure, there is provided a haptic glove apparatus including: a glove-shaped base portion; and at least one actuator provided on the glove-shaped base portion, wherein the at least one actuator includes: a first portion extending in a first direction and configured to expand or contract in the first direction; and an second portion provided to surround the first portion of the at least one actuator and configured to expand or contract in a second direction perpendicular to the first direction based on an expansion or a contraction of the first portion.

The first portion of the at least one actuator may be a driving force applying portion that includes a shape memory alloy.

The second portion of the at least one actuator may be an elastic support portion, which has a cross-sectional shape in the second direction having a greatest height at a center.

The glove-shaped base portion may include a first finger cover portion, a second finger cover portion, a third finger cover portion, a fourth finger cover portion, and a fifth finger cover portion, and a palm cover portion connected to each of the first finger cover portion, the second finger cover portion, the third finger cover portion, the fourth finger cover portion, and the fifth finger cover portion, and the at least one actuator may include a plurality of actuators, wherein the plurality of actuators are provided on at least one of the first finger cover portion, the second finger cover portion, the third finger cover portion, the fourth finger cover portion, and the fifth finger cover portion and the palm cover portion.

The first finger cover portion may include a first first finger joint portion and a second first finger joint portion, which are provided with a certain interval therebetween in one direction, and wherein the plurality of actuators may be provided on at least one of the first first finger joint portion and the second first finger joint portion.

The second finger cover portion may include a first second finger joint portion, a second second finger joint portion, and a third second finger joint portion, which are provided with a certain interval therebetween in one direction, the third finger cover portion may include a first third finger joint portion, a second third finger joint portion, and a third third finger joint portion, which are disposed with a certain interval therebetween in one direction, the fourth finger cover portion may include a first fourth finger joint portion, a second fourth finger joint portion, and a third fourth finger joint portion, which are provided with a certain interval therebetween in one direction, and the fifth finger cover portion may include a first fifth finger joint portion, a second fifth finger joint portion, and a third fifth finger joint portion, which are disposed with a certain interval therebetween in one direction, and wherein the plurality of actuators may be provided on at least one of the first second finger joint portion, second second finger join portion, the third second finger joint portion, the first third finger joint portion, second third finger join portion, the third third finger joint portion, the first fourth finger joint portion, second fourth finger join portion, the third fourth finger joint portion, and the first fifth finger joint portion, second fifth finger join portion, and the third fifth finger joint portion.

The palm cover portion may include an upper palm cover portion adjacent to the first finger cover portion, the second finger cover portion, the third finger cover portion, the fourth finger cover portion, and the fifth finger cover portion and a lower palm cover portion disposed adjacent to the upper palm cover portion, and wherein the plurality of actuators may be provided on at least one of the upper palm cover portion and the lower palm cover portion.

The at least one actuator may include a plurality of actuators that are aligned in one direction with a certain interval therebetween.

The haptic glove apparatus may further include a processor configured to control a driving force applied by the first portion of the at least one actuator.

A height of the second portion of the at least one actuator expanding or contracting in the second direction may be changed according to a driving signal applied by the processor.

According to another aspect of the disclosure, there is provided a virtual reality apparatus including: a display device configured to display a plurality of display modes; and a haptic glove apparatus including a glove-shaped base portion and at least one actuator provided on the glove-shaped base portion, wherein the at least one actuator includes: a first portion extending in a first direction and configured to expand or contract in the first direction; and an second portion provided to surround the first portion of the at least one actuator and configured to expand or contract in a second direction perpendicular to the first direction based on an expansion or a contraction of the first portion, wherein the at least one actuator included in the haptic glove apparatus is configured to operate according to the plurality of display modes displayed on the display device.

The display device may include an augmented reality glass or a virtual reality glass.

The glove-shaped base portion may include a first finger cover portion, a second finger cover portion, a third finger cover portion, a fourth finger cover portion, and a fifth finger cover portion, and a palm cover portion connected to the first finger cover portion, the second finger cover portion, the third finger cover portion, the fourth finger cover portion, and the fifth finger cover portion, and wherein the at least one actuator may include a plurality of actuators, wherein the plurality of actuators are provided on at least one of the first finger cover portion, the second finger cover portion, the third finger cover portion, the fourth finger cover portion, and the fifth finger cover portion and the palm cover portion.

The first finger cover portion may include a first first finger joint portion and a second first finger joint portion, which are provided with a certain interval therebetween in one direction, and wherein the plurality of actuators may be provided on at least one of the first first finger joint portion and the second first finger joint portion.

The second finger cover portion may include a first second finger joint portion, a second second finger joint portion, and a third second finger joint portion, which are provided with a certain interval therebetween in one direction, the third finger cover portion may include a first third finger joint portion, a second third finger joint portion, and a third third finger joint portion, which are disposed with a certain interval therebetween in one direction, the fourth finger cover portion may include a first fourth finger joint portion, a second fourth finger joint portion, and a third fourth finger joint portion, which are provided with a certain interval therebetween in one direction, and the fifth finger cover portion may include a first fifth finger joint portion, a second fifth finger joint portion, and a third fifth finger joint portion, which are disposed with a certain interval therebetween in one direction, and wherein the plurality of actuators may be provided on at least one of the first second finger joint portion, second second finger join portion, the third second finger joint portion, the first third finger joint portion, second third finger join portion, the third third finger joint portion, the first fourth finger joint portion, second fourth finger join portion, the third fourth finger joint portion, and the first fifth finger joint portion, second fifth finger join portion, and the third fifth finger joint portion.

The palm cover portion may include an upper palm cover portion adjacent to the first finger cover portion, the second finger cover portion, the third finger cover portion, the fourth finger cover portion, and the fifth finger cover portion and a lower palm cover portion disposed adjacent to the upper palm cover portion, and wherein the plurality of actuators may be provided on at least one of the upper palm cover portion and the lower palm cover portion.

The plurality of display modes may include at least one of a grab display mode, a palming display mode, and a point display mode.

The display device may be configured to display the grab display mode, and the plurality of actuators may be provided on the first first finger joint portion, the second first finger joint portion, the first second finger joint portion, the second second finger joint portion, the third second finger joint portion, the first third finger joint portion, the second third finger joint portion, the third third finger joint portion, the first fourth finger joint portion, the second fourth finger joint portion, the third fourth finger joint portion, the first fifth finger joint portion, the second fifth finger joint portion, the third fifth finger joint portion, the upper palm cover portion and the lower palm cover portion, may be configured to operate based on the grab display mode.

The plurality of actuators provided on the upper palm cover portion and the lower palm cover portion may be deformed, and the display device is configured to display the palming display mode.

The display device may be configured to display a point display mode, and an actuator provided on the first second finger joint portion operates based on the point display mode.

According to another aspect of the disclosure, there is provided a wearable haptic apparatus including: a base portion configured to be worn by a user; and one or more actuators provided on the base portion, each of the one or more actuators including: a first portion extending in a first direction and configured to expand or contract in the first direction; and a second portion connected to the first portion and surrounding the first portion, wherein the second portion is configured to expand or contract in a second direction perpendicular to the first direction based on an expansion or a contraction of the first portion.

The base portion may be further configured to conform to a body part of the user.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
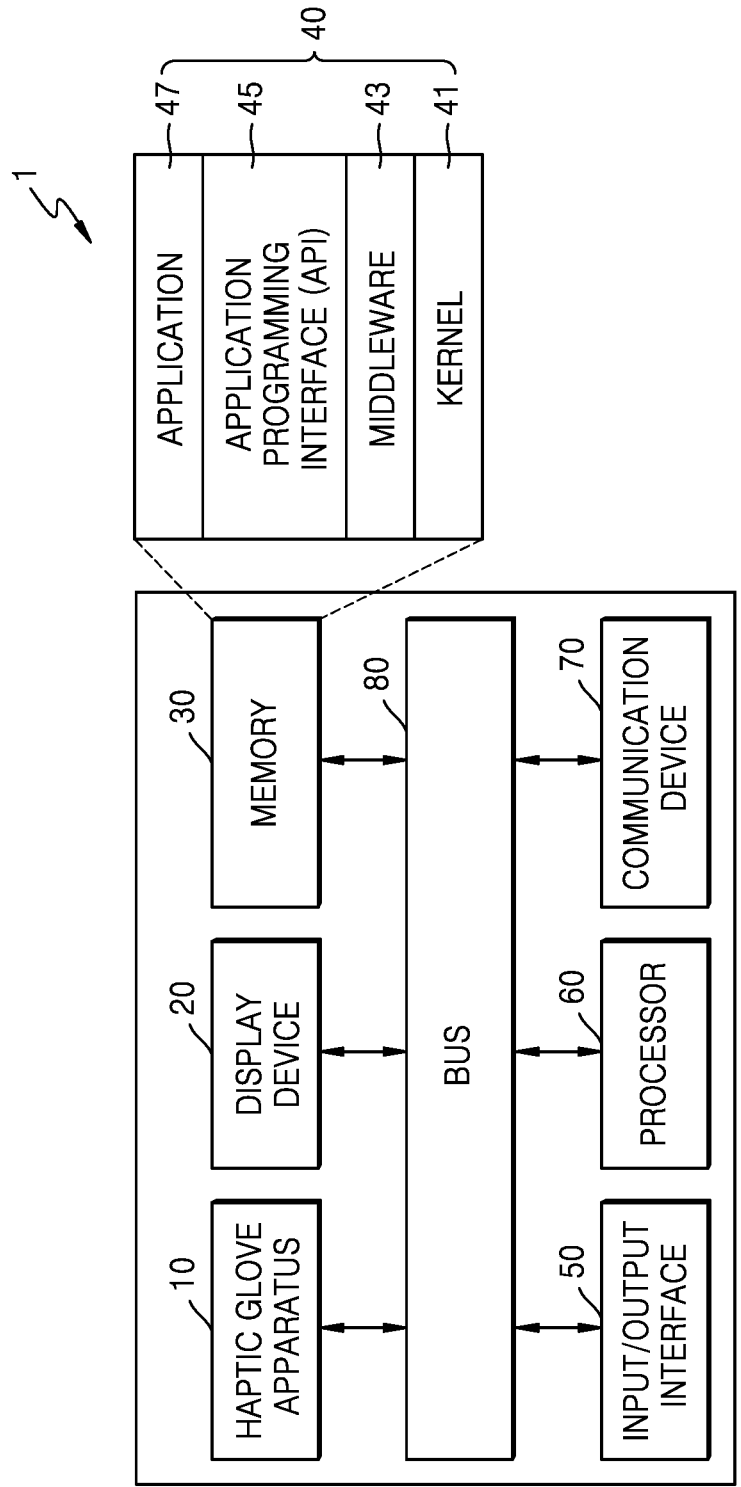
FIG. 1 is a block diagram of a virtual reality apparatus according to one or more example embodiments of the disclosure.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

It should be understood that, when a part "comprises" or "includes" an element in the specification, unless otherwise defined, it is not excluding other elements but may further include other elements. Also, in the specification, the term "units" or " . . . modules" denote units or modules that process at least one function or operation, and may be realized by hardware, software, or a combination of hardware and software.

Hereinafter, one or more example embodiments of the disclosure will be described in detail with reference to the attached drawings to allow those of ordinary skill in the art to easily carry out the example embodiments of the disclosure. However, the disclosure may be implemented in various forms, and are not limited to the one or more example embodiments of the disclosure described herein. To clearly describe the disclosure, parts that are not associated with the description have been omitted from the drawings, and throughout the specification, identical reference numerals refer to identical parts.

Figure 2:
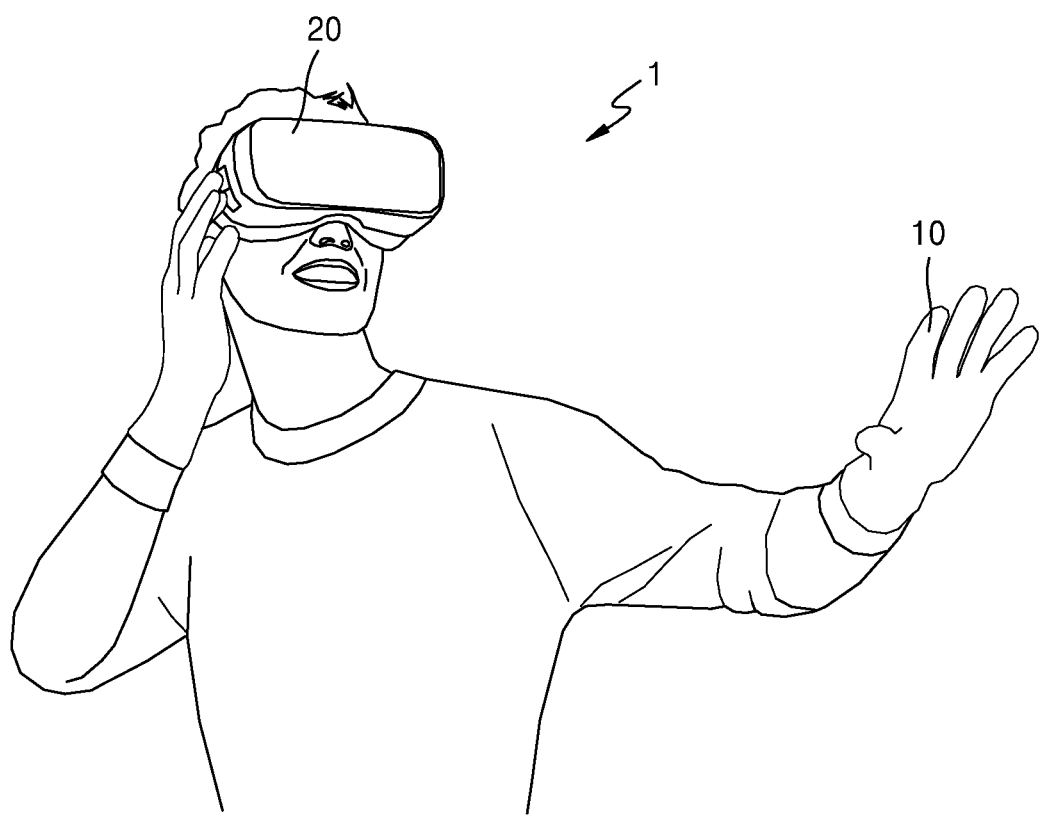
FIG. 2 is a schematic diagram illustrating a virtual reality apparatus according to one or more example embodiments of the disclosure.

FIG. 1 is a block diagram of a virtual reality apparatus 1 according to one or more example embodiments of the disclosure. FIG. 2 is a schematic diagram illustrating a virtual reality apparatus according to one or more example embodiments of the disclosure.

According to an example embodiment, a virtual environment implemented by the virtual reality apparatus 1 may include at least one of virtual reality, augmented reality, and mixed reality, which are generated based on content. For example, the virtual environment may refer to a visualized immersive spatial environment that creates perceptual experiences (e.g., visual, auditory, and tactile experiences, etc.) such as experiencing a physical space. According to an example embodiment, virtual reality, augmented reality, or mixed reality refers to a virtual environment similar to a real environment artificially created using a computing device, or a computing technology for creating a virtual environment. Real physical objects within a virtual environment may be digitally simulated to provide a perceptual experience to a user by interacting with the user.

Referring to FIGS. 1 and 2, the virtual reality apparatus 1 according to an example embodiment may include a haptic glove apparatus 10, a display device 20, a memory 30, an input/output interface 50, a processor 60, a communication device 70, and a bus 80. In some example embodiments of the disclosure, at least one of the haptic glove apparatus 10, the display device 20, the memory 30, the input/output interface 50, the processor 60, the communication device 70, and the bus 80 in the virtual reality apparatus 1 may be omitted, or the virtual reality apparatus 1 may further include other components. That is, according to one or more example embodiment of the disclosures, the virtual reality apparatus 1 is not limited to the arrangement of the components illustrated in FIG. 1, and as such, the virtual reality apparatus 1 may include various combination of components.

The haptic glove apparatus 10 is a device for realizing a tactile experience among the above-described perceptual experiences. As an example, the haptic glove apparatus 10 may include one or more actuators 100 (referring to FIG. 3A) and a glove-shaped base portion 200 (referring to FIG. 4A). The haptic glove apparatus 10 will be described in detail below with reference to FIGS. 3A, 3B, 3C, 4A, 4B and 5.

The display device 20 is a device for realizing a visual experience among the above-described perceptual experiences. As an example, the display device 20 may include a virtual reality glass capable of implementing three-dimensional (3D) visualization of virtual reality, or an augmented reality glass capable of implementing 3D visualization of augmented reality. However, the disclosure is not limited thereto, and the display device 20 according to an example embodiment may include a two-dimensional display device capable of implementing two-dimensional (2D) visualization.

The memory 30 includes volatile memory and/or non-volatile memory. For example, the memory 30 may store commands or data related to at least one other component of the virtual reality apparatus 1. For example, the volatile memory may be used as a buffer for storing one or more layers of graphic content that may be displayed on the display device 20.

According to an example embodiment of the disclosure, the memory 30 stores software and/or a program 40. For example, the program 40 includes a kernel 41, middleware 43, an application programming interface (API) 45, and/or an application 47. According to an example embodiment, at least some of the kernel 41, the middleware 43, and the API 45 may be referred to as an operating system (OS).

The input/output interface 50 may perform an interface function capable of transmitting commands or data input to a component(s) other than the input/output interface 50 in the virtual reality apparatus 1 from a user or an external device. In addition, the input/output interface 50 outputs commands or data received from other component(s) of the virtual reality apparatus 1 to a user or an external device.

The processor 60 may include at least one of a central processing unit (CPU), an application processor (AP), a graphics processor unit (GPU), and a communication processor (CP). The processor 60 may control at least one other component of the virtual reality apparatus 1 and/or perform an operation or data processing related to communication.

The processor 60 may be referred to as a controller, or may include a controller as part of the processor 60 or may constitute part of the controller. The controller may control at least one other component of the virtual reality apparatus 1, for example, the haptic glove apparatus 10, the display device 20, the memory 30, the input/output interface 50, and the communication interface 70.

According to an example embodiment, the communication interface 70 establishes communication between the virtual reality apparatus 1 and an external electronic device. For example, the communication interface 70 may be connected to a network through wired or wireless communication in order to communicate with an external device, such as an external electronic device or a server. In one or more example embodiments, the communication interface 70 may also communicate with an external electronic device by using wireless communication.

The bus 80 may include, for example, a circuit for connecting the haptic glove apparatus 10, the display device 20, the memory 30, the input/output interface 50, the processor 60, the communication device 70 of the virtual reality apparatus 1 to transmit communication (e.g., control messages and/or data) between the components.

Figure 3A:
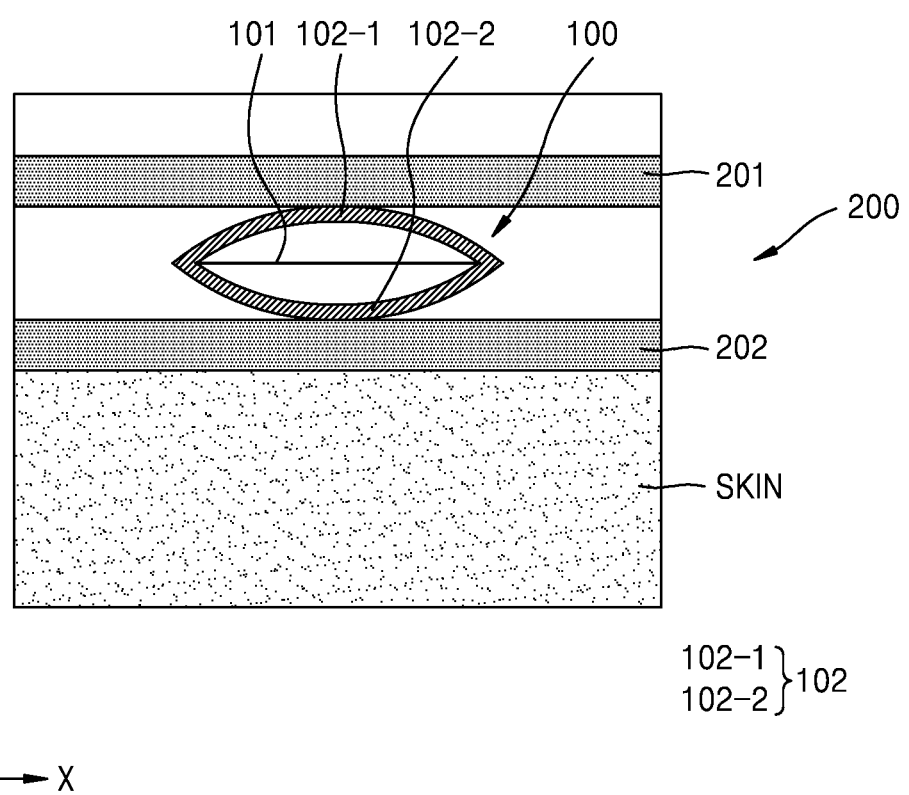
FIG. 3A is a schematic diagram of an actuator according to one or more example embodiments of the disclosure.
Figure 3B:
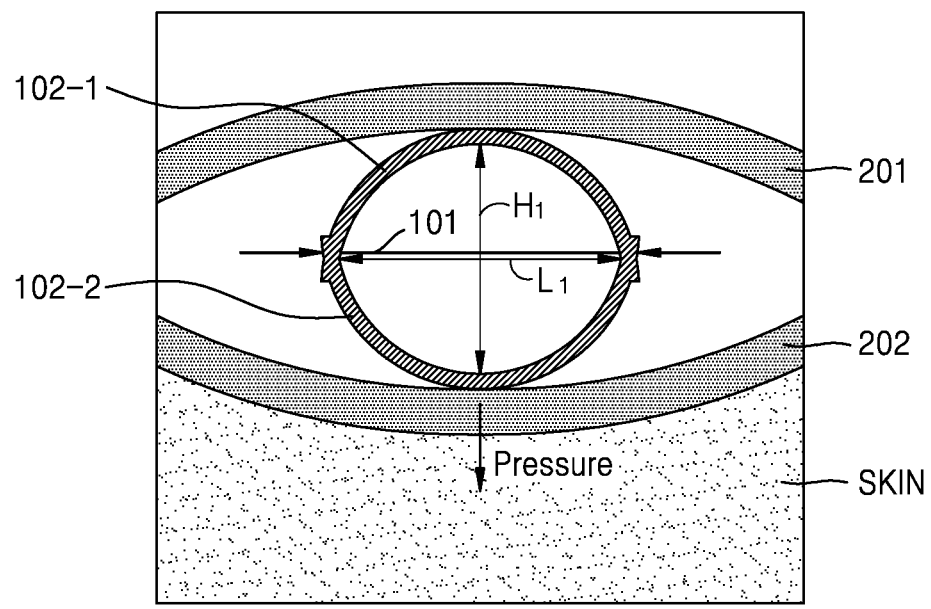
FIG. 3B is a schematic diagram of an actuator according to one or more example embodiments of the disclosure.
Figure 3C:
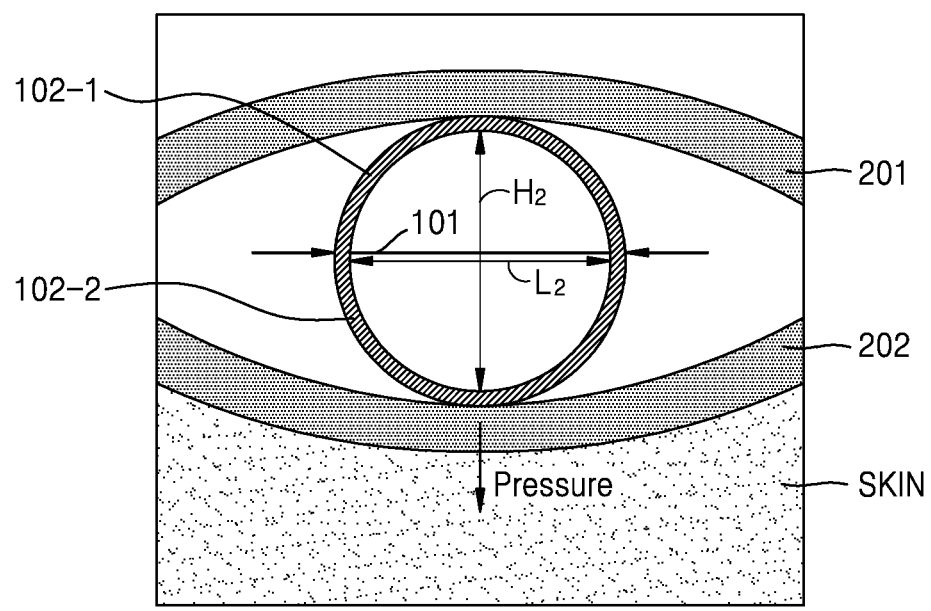
FIG. 3C is a schematic diagram of an actuator according to one or more example embodiments of the disclosure.
Figure 4A:
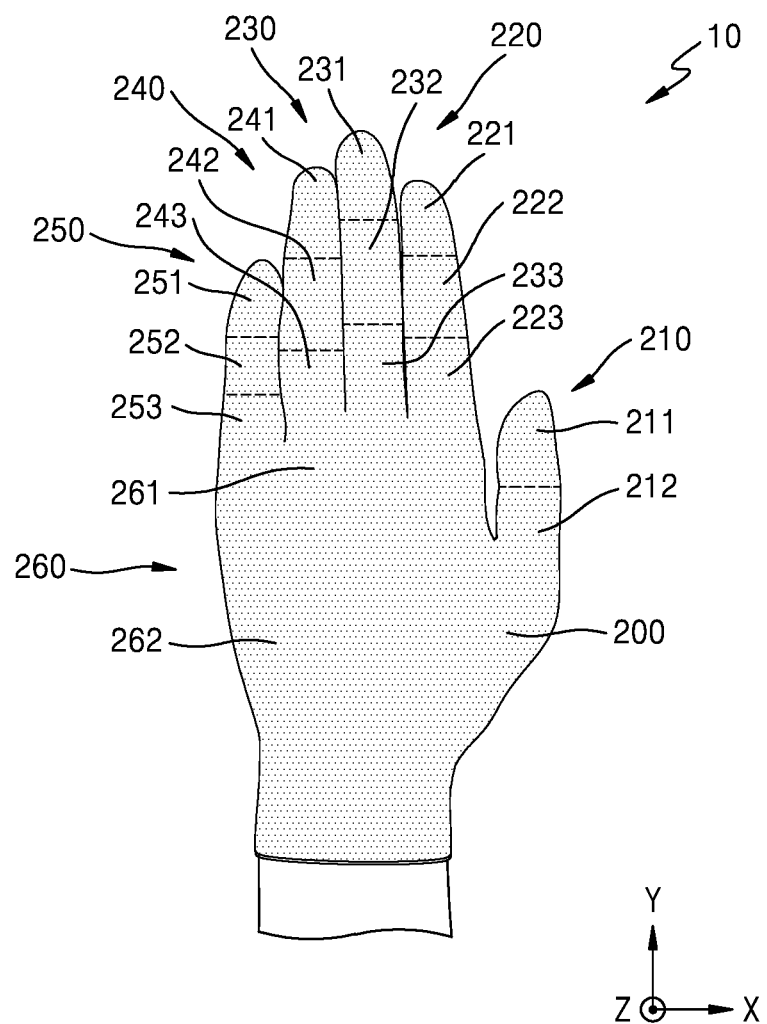
FIG. 4A is a plan view of a haptic glove apparatus according to one or more example embodiments of the disclosure.
Figure 4B:
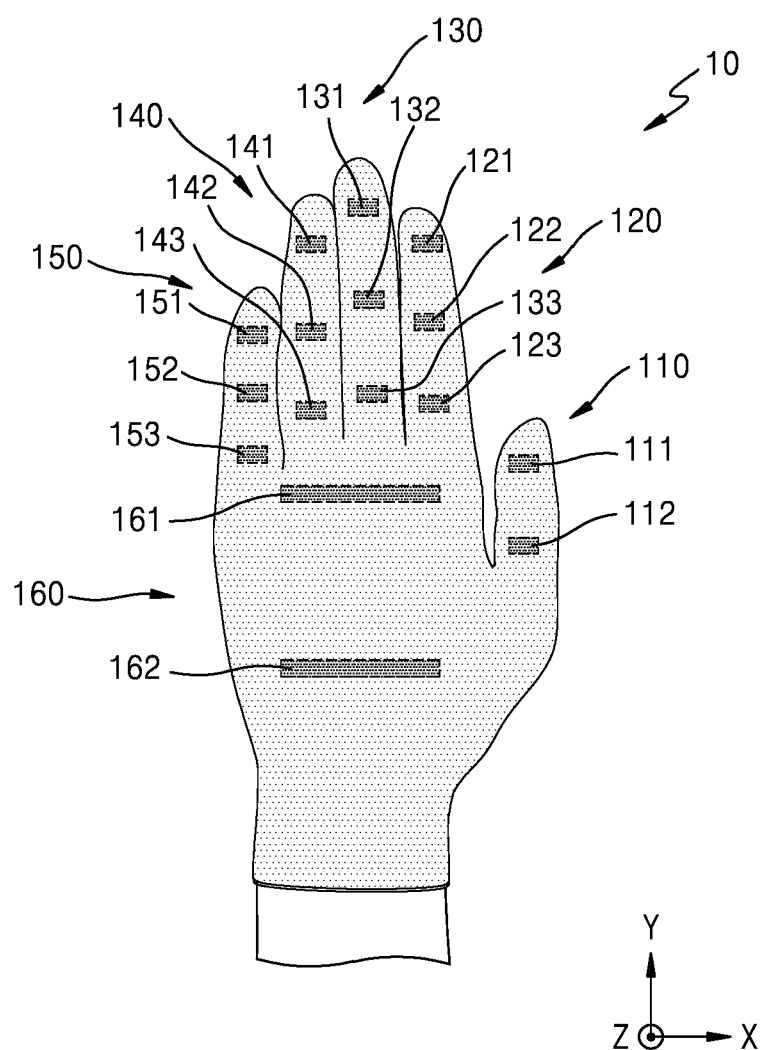
FIG. 4B is a plan view of a haptic glove apparatus in which an actuator is displayed according to one or more example embodiments of the disclosure.

FIG. 3A is a schematic diagram of an actuator according to one or more example embodiments of the disclosure. FIG. 3B is a schematic diagram of an actuator according to one or more example embodiments of the disclosure. FIG. 3C is a schematic diagram of an actuator according to one or more example embodiments of the disclosure. FIG. 4A is a plan view of a haptic glove apparatus according to one or more example embodiments of the disclosure. FIG. 4B is a plan view of a haptic glove apparatus in which an actuator is displayed according to one or more example embodiments of the disclosure.

Referring to FIGS. 3A and 3B, one or more actuators 100 according to an example embodiment may be provided on a base portion 200. As an example, the one or more actuators 100 may apply pressure to a user's skin in a second direction (Z direction). In this case, the user may experience a virtual sense of touch by grasping an object or performing a certain action by perceiving a sense of touch (tactile sensation). As an example, the one or more actuators 100 may include a driving force applying portion 101 expanding or contracting in a first direction (X direction), and an elastic support portion 102 disposed to surround the driving force applying portion 101.

The driving force applying portion 101 may be arranged to be surrounded by the elastic support portion 102 to be described below. As an example, the driving force applying portion 101 may be provided to extend in the first direction (X direction). In this case, the driving force applying portion 101 may expand or contract in the first direction (X direction) as a driving force signal is applied to driving force applying portion 101. For example, the driving force applying portion 101 may apply a driving force to the elastic support portion 102 in the second direction (Z direction) perpendicular to the first direction (X direction) as the driving force applying portion 101 expands or contracts in the first direction (X direction).

The driving force applying portion 101 according to an example embodiment may include a material whose shape may be changed to a predetermined shape according to a certain driving signal, such as a shape memory alloy (SMA) element or an electro active polymer. In the example embodiment, an example of the driving force applying portion 101 is assumed to be an SMA element, but the disclosure is not limited thereto.

The driving force applying portion 101 according to an example embodiment may include an SMA element, and in this case, the SMA element may be a member that undergoes contraction and deformation due to heat. For example, the SMA element may include a nickel-titanium (Ni—Ti) alloy, a copper-zinc (Cu—Zn) alloy, a gold-cadmium (Au—Cd) alloy, an indium-titanium (In—Ti) alloy, or the like. As an example, the processor 60 may control a driving force by generating a driving signal for contracting and deforming the SMA element.

As an example, a driving signal portion may supply a driving current for contracting and deforming the SMA element by using a driving signal received from the processor 60. According to an example embodiment, in order for the driving force applying portion 101 to cause contraction and deformation, the temperature of the SMA element has to be equal to or greater than a threshold temperature. For example, the threshold temperature differs with the SMA element. For example, the threshold temperature of the SMA element may be about 43° C. to about 45° C. The threshold temperature is a temperature for contracting and deforming the SMA element, and may also be referred to as a deformation temperature. As an example, the processor 60 may control the driving signal portion to apply a preheating current such that the SMA element reaches a state just before reaching the threshold temperature, that is, reaches a preheating temperature, before a driving signal is applied to offset a difference in response time converted from a room temperature to a deformation temperature, and may control a driving current to be applied when a driving signal is input.

The elastic support portion 102 may be disposed to surround the driving force applying portion 101. The elastic support portion 102 according to an example embodiment may include an elastic material capable of expanding or contracting in the second direction (Z direction) according to a driving force applied from the driving force applying portion 101. As an example, the elastic support portion 102 may include a first elastic support portion 102-1 and a second elastic support portion 102-2 respectively disposed above and below the driving force applying portion 101 with the driving force applying portion 101 therebetween. For example, the first elastic support portion 102-1 may be provided above the driving force applying portion 101 and may extend longer than the driving force applying portion 101 in the first direction (X direction). In this case, both sides of the driving force applying portion 101 may be provided to be fixed to both sides of the first elastic support portion 102-1. Accordingly, the first elastic support portion 102-1 may have a bow type shape. In addition, the second elastic support portion 102-2 may be provided below the driving force applying portion 101 and may extend longer than the driving force applying portion 101 in the first direction (X direction). In this case, both sides of the driving force applying portion 101 may be provided to be fixed to both sides of the second elastic support portion 102-2. Accordingly, the second elastic support portion 102-2 may have a bow type shape. In this case, both sides of the first elastic support portion 102-1 may be fixed to both sides of the second elastic support portion 102-2. Accordingly, the cross-sectional shape of the elastic support portion 102 cut in the second direction (Z direction) may be an elliptical shape in which a height H of the center thereof is largest. In the above-described example embodiment, in consideration of manufacturing convenience, the elastic support part 102 has a separated form, for example, the first elastic support portion 102-1 and the second elastic support portion 102-2 which are separable from each other. However, the disclosure is not limited thereto. The elastic support portion 102 may be provided as an integral type in which the first elastic support portion 102-1 and the second elastic support portion 102-2 are integrally formed.

The degree to which the elastic support portion 102 contracts or expands in the second direction (Z direction) may be changed according to the degree to which the driving force applying portion 101 expands or contracts in the first direction (X direction). As an example, when the driving force applying portion 101 includes an SMA element, the degree of expansion deformation and contraction deformation of the SMA element may be changed according to the magnitude of a driving current applied to the SMA element, and the degree of expansion deformation and contraction deformation of the elastic support portion 102 may be adjusted.

Referring to FIG. 3B, the driving force applying portion 101 according to an example embodiment may be contracted to a first length $L_1$ by receiving a driving current according to a first driving signal. In this case, the center of the elastic support portion 102 may expand to have a first height $H_1$. As the center of the elastic support portion 102 expands to the first height $H_1$, a certain pressure may be applied to a user's skin in the second direction (Z direction). In this case, the user may perceive a sense of touch implemented in virtual reality.

On the other hand, referring to FIG. 3C, the driving force applying portion 101 according to an example embodiment may be contracted to a second length $L_2$ by receiving a driving current according to a second driving signal. In this case, the second length $L_2$ may be less than the first length $L_1$ shown in FIG. 3B. In addition, in this case, the center of the elastic support portion 102 may expand to have a second height $H_2$. In this case, the second height $H_2$ may be greater than the first height $H_1$ shown in FIG. 3B.

As the center of the elastic support portion 102 expands to the second height $H_2$, a certain pressure may be applied to the user's skin in the second direction (Z direction). In this case, the user may perceive a pressure greater than the pressure felt from the elastic support portion 102 shown in FIG. 3B. That is, the height H of the center of the elastic support portion 102 may be changed according to the degree to which the driving force applying portion 101 contracts, and accordingly, the amount of pressure applied to the user may be changed. Accordingly, the processor 60 may apply various pressures to the user by adjusting the driving signal. Accordingly, the user may experience various senses of touch in various virtual environments.

Referring to FIGS. 4A and 4B, the base portion 200 according to an example may have a glove shape to support one or more actuators 100. As an example, the base portion 200 may include an elastic material that may be deformed. For example, the base portion 200 may be a poly glove, but the disclosure is not limited thereto. The base portion 200 may include two layers to support the one or more actuators 100. As an example, as shown in FIGS. 3A to 3C, the base portion 200 may include a one-ply outer skin 201 and a one-ply inner skin 202. The one or more actuators 100 may be provided and supported between the one-ply outer skin 201 and the one-ply inner skin 202. However, the disclosure is not limited thereto, and the base portion 200 may have any other structure capable of supporting the one or more actuators 100. Hereinafter, a position at which the one or more actuators 100 are disposed will be described based on the shape of the glove-shaped base unit 200.

According to another example embodiment, the base portion 200 may have a wearable shape different from the glove shape illustrated in FIG. 4A. For instance, the base portion may be wearable on a part of a user's body different from the hand.

According to an example embodiment, the base portion 200 may include a first finger cover portion 210, a second finger cover portion 220, a third finger cover portion 230, a fourth finger cover portion 240, a fifth finger cover portion 250, and a palm cover portion 260 connected to the first finger cover portion 210, the second finger cover portion 220, the third finger cover portion 230, the fourth finger cover portion 240, and the fifth finger cover portion 250. As an example, the first finger cover portion 210 may correspond to the shape of the user's thumb, the second finger cover portion 220 may correspond to the shape of the user's index finger, the third finger cover portion 230 may correspond to the shape of the user's middle finger, the fourth finger cover portion 240 may correspond to the shape of the user's ring finger, the fifth finger cover portion 250 may correspond to the shape of the user's little finger, and the palm cover portion 260 may correspond to the shape of the user's palm.

According to an example embodiment, a plurality of actuators 100 may be provided, and the plurality of actuators 100 may be disposed on at least one of the first finger cover portion 210, the second finger cover portion 220, the third finger cover portion 230, the fourth finger cover portion 240, the fifth finger cover portion 250 and the palm cover portion 260. For example, referring to FIG. 4B, the plurality of actuators 100 may include a first actuator 110, a second actuator 120, a third actuator 130, a fourth actuator 140, a fifth actuator 150 and a sixth actuator 160. In this case, the first actuator 110, the second actuator 120, the third actuator 130, the fourth actuator 140, the fifth actuator 150 and the sixth actuator 160 may be disposed on the second finger cover portion 220, the third finger cover portion 230, the fourth finger cover portion 240, the fifth finger cover portion 250 and the palm cover portion 260, respectively. Pain sensation in which the user perceives a sense of touch may be distributed over the entire region of the user's hand. Accordingly, in order to implement the sense of touch of virtual reality perceived by the user, the region of the base portion 200 may be subdivided and a plurality of actuators 100 may be disposed in corresponding regions, thereby implementing a sense of touch that is similar to an actual sense of touch.

According to an example embodiment, the first finger cover portion 210 corresponding to the thumb may include a (1-1)th finger joint portion 211 and a (1-2)th finger joint portion 212, which are distinguished from each other based on a finger joint. According to an example, the (1-1)th finger joint portion 211 and the (1-2)th finger joint portion 212 may be disposed in one direction with a certain interval therebetween. In this case, the plurality of actuators 100 may be disposed on at least one of the (1-1)th finger joint portion 211 and the (1-2)th finger joint portion 212. For example, the plurality of actuators 100 may include a (1-1)th actuator 111 to a (1-2)th actuator 112. In this case, the (1-1)th actuator 111, and the (1-2) actuator 112 may be disposed on the (1-1)th finger joint portion 211 and the (1-2)th finger joint portion 212, respectively.

According to an example embodiment, the second finger cover portion 220 corresponding to the index finger may include a (2-1)th finger joint portion 221, a (2-2)th finger joint portion 222, and a (2-3)th finger joint portion 223, which are distinguished from each other based on finger joints. According to an example, the (2-1)th finger joint portion 221, the (2-2)th finger joint portion 222 and the (2-3)th finger joint portion 223 may be disposed in one direction with a certain interval therebetween. In this case, the plurality of actuators 100 may be disposed on at least one of the (2-1)th finger joint portion 221 to the (2-3)th finger joint portion 223. For example, the plurality of actuators 100 may include a (2-1)th actuator 121, a (2-2)th actuator 122, and a (2-3)th actuator 123. In this case, the (2-1)th actuator 121 to the (2-3)th actuator 123 may be disposed on the (2-1)th finger joint portion 221 to the (2-3)th finger joint portion 223, respectively.

According to an example embodiment, the third finger cover portion 230 corresponding to the middle finger may include a (3-1)th finger joint portion 231, a (3-2)th finger joint portion 232, and a (3-3)th finger joint portion 233, which are distinguished from each other based on finger joints. In this case, at least one of a (3-1)th actuator 131, a (3-2)th actuator 132, and a (3-3) actuator 133 may be disposed on the (3-1)th finger joint portion 231 to the (3-3)th finger joint portion 233.

According to an embodiment, the fourth finger cover portion 240 corresponding to the ring finger may include a (4-1)th finger joint portion 241, a (4-2)th finger joint portion 242, and a (4-3)th finger joint portion 243, which are distinguished from each other based on finger joints. In this case, at least one of a (4-1)th actuator 141, a (4-2)th actuator 142, and a (4-3)th actuator 143 may be disposed on the (4-1)th finger joint portion 241 to the (4-3)th finger joint portion 243.

According to an embodiment, the fifth finger cover portion 250 corresponding to the little finger may include a (5-1)th finger joint portion 251, a (5-2)th finger joint portion 252 and a (5-3)th finger joint portion 253, which are distinguished from each other based on finger joints. In this case, at least one of a (5-1)th actuator 151, a (5-2)th actuator 152, and a (5-3)th actuator 153 may be disposed on the (5-1)th finger joint portion 251 to the (5-3)th finger joint portion 253.

According to an example embodiment, the palm cover portion 260 corresponding to the palm may include an upper palm cover portion 261 adjacent to the first finger cover portion 210 to the fifth finger cover portion 250, and a lower palm cover portion 262 disposed adjacent to the upper palm cover portion 261. In this case, at least one of a (6-1)th actuator 161 and a (6-2)th actuator 162 may be disposed on the upper palm cover portion 261 and the lower palm cover portion 262. In order to implement the sense of touch of virtual reality perceived by a user, the region of the base portion 200 may be subdivided and the plurality of actuators 100 may also be subdivided, and thus, a sense of touch that is similar to an actual sense of touch may be implemented.

Figure 5:
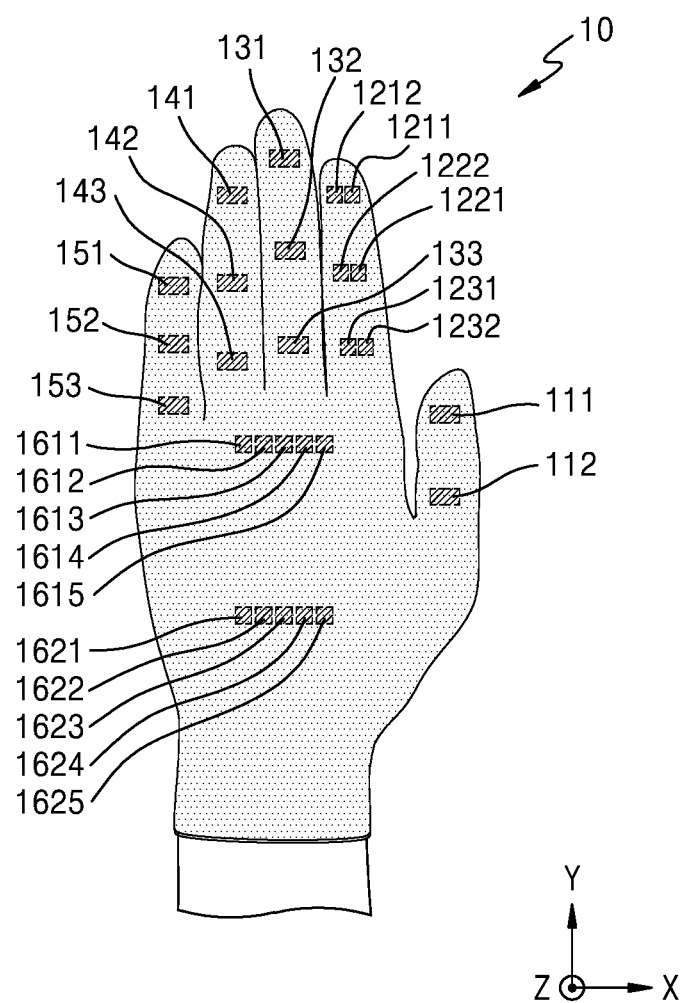
FIG. 5 is a plan view of a haptic glove apparatus in which an actuator is displayed according to one or more example embodiments of the disclosure.

FIG. 5 is a plan view of a haptic glove apparatus in which an actuator is displayed according to one or more embodiments of the disclosure.

Referring to FIG. 5, a plurality of actuators 100 according to an example embodiment may be provided, and the plurality of actuators 100 may be arranged to be aligned in one direction with a certain interval therebetween. For example, all regions of the base portion 200 in which the actuators 100 are disposed may not be uniform. As an example, when comparing the area of the (1-1)th finger joint portion 211 with the area of the upper palm cover portion 261, it may be seen that the area of the upper palm cover portion 261 is larger than the area of the (1-1)th finger joint portion 211. In this case, when one actuator 100 is disposed on each of the (1-1)th finger joint portion 211 and the upper palm cover portion 261, a sense of touch that is different from an actual sense of touch may be implemented.

According to an example embodiment, a plurality of actuators 100 may be provided on the upper palm cover portion 261 and the lower palm cover portion 262 having a relatively large area. For example, in the upper palm cover portion 261, a (6-11)th actuator 1611, a (6-12)th actuator 1612, a (6-13)th actuator 1613, a (6-14)th actuator 1614 and a (6-15)th actuator 1615 obtained by subdivision may be arranged to be aligned in one direction with a certain distance therebetween. In addition, in the lower palm cover portion 262, a (6-21)th actuator 1621, a (6-22)th actuator 1622, a (6-23)th actuator 1623, a (6-24)th actuator 1624 and to a (6-25)th actuator 1625 may be arranged to be aligned in one direction with a certain interval therebetween. In this case, the (6-11)th actuator 1611 to the (6-15)th actuator 1615 and the (6-21)th actuator 1621 to the (6-25)th actuator 1625 may be individually driven by receiving driving signals from the processor 60 to thereby implement various senses of touch.

Regardless of the area, a plurality of actuators may be arranged for precise implementation of a sense of touch. For example, a (2-11)th actuator 1211, a (2-12)th actuator 1212, a (2-21)th actuator 1221, a (2-22)th actuator 1222, a (2-31)th actuator 1231 and a (2-32)th actuator 1232 obtained by subdivision may be disposed on the (2-1)th finger joint portion 221, the (2-3)th finger joint portion 223 and the (2-3)th finger joint portion 223. As described above, by arranging the plurality of actuators 100 in various positions and areas, and individually driving the plurality of actuators 100, a sense of touch that is similar to an actual sense of touch may be implemented.

Figure 6:
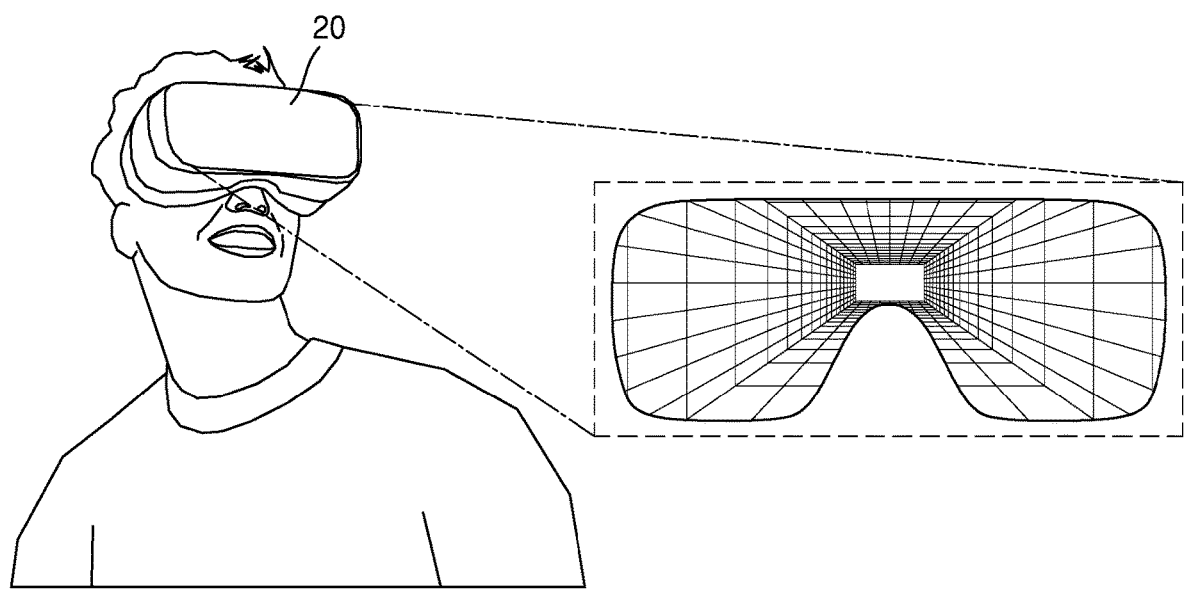
FIG. 6 is a schematic diagram of a display device according to one or more example embodiments of the disclosure.

FIG. 6 is a schematic diagram of a display device according to various embodiments of the disclosure.

Referring to FIG. 6, the display device 20 according to an example embodiment may provide a user with a virtual environment including at least one of virtual reality, mixed reality, and augmented reality. For example, the display device 20 may be a virtual reality apparatus (VRD), such as a head mounted display (HMD) device or a virtual reality headset (VRH). The display device 20 may be a combined virtual reality apparatus capable of providing content for virtual reality to a user by combining with the haptic glove apparatus 10 described above, but is not limited thereto. Hereinafter, for convenience, a case where the display device 20 is combined with the haptic glove apparatus 10 to provide content for virtual reality will be described as an example.

According to an example embodiment, the display device 20 may include at least one lens, and the at least one lens may correspond to the position of a user's eyes when the user wears the display device 20. According to an example embodiment, at least one lens fixed to correspond to the positions of both eyes of a user of an electronic device may face a display screen of the electronic device on an opposite surface facing both eyes of the user. Accordingly, a user of the display device 20 may view content for a virtual environment through a lens of an external device.

According to an example embodiment, the display device 20 may include a display including at least one lens, and may receive content for a virtual environment and provide the received content to a user through the display of the display device 20. The display device 20 may receive content for a virtual environment from the processor 60, for example, information related to a plurality of display modes, provide the plurality of display modes to the display, and output information related to at least a portion of the received content. In this case, the haptic glove apparatus 10 may operate according to a plurality of display modes displayed on the display device 20 to provide a virtual reality experience to a user. Hereinafter, the haptic glove apparatus 10, which operates according to a plurality of display modes displayed on the display device 20, for example, a grab display mode, a palming display mode, and a point display mode, is described.

Figure 7A:
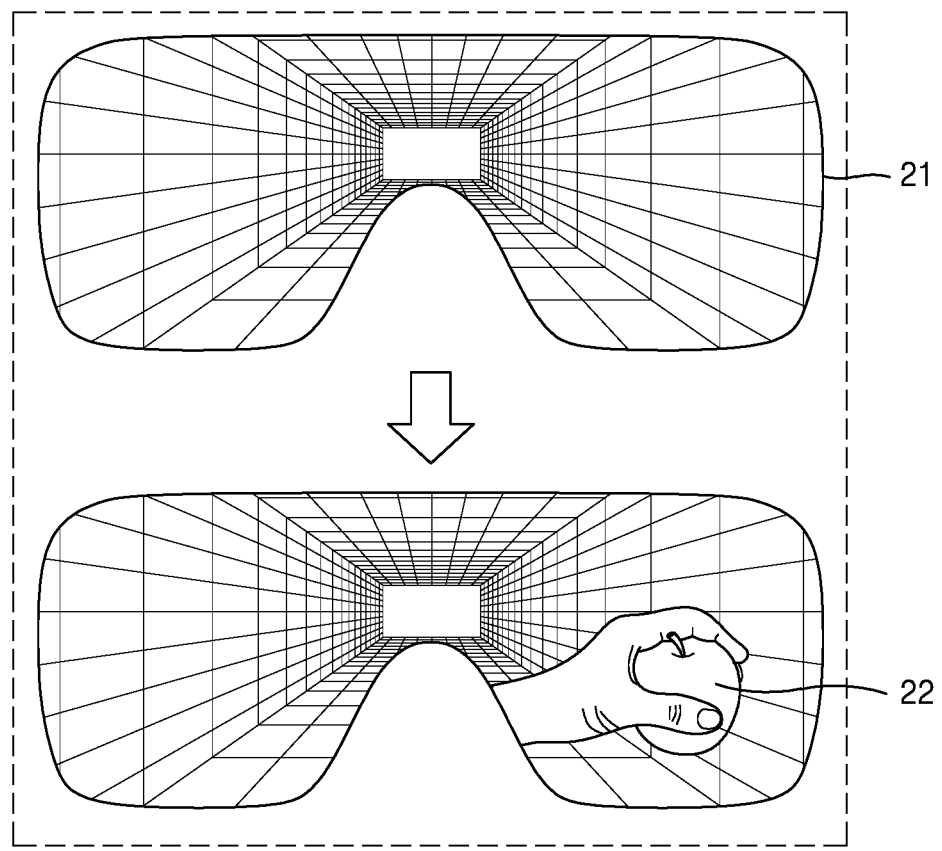
FIG. 7A is a schematic diagram of a display displaying a grab display mode according to one or more example embodiments of the disclosure.
Figure 7B:
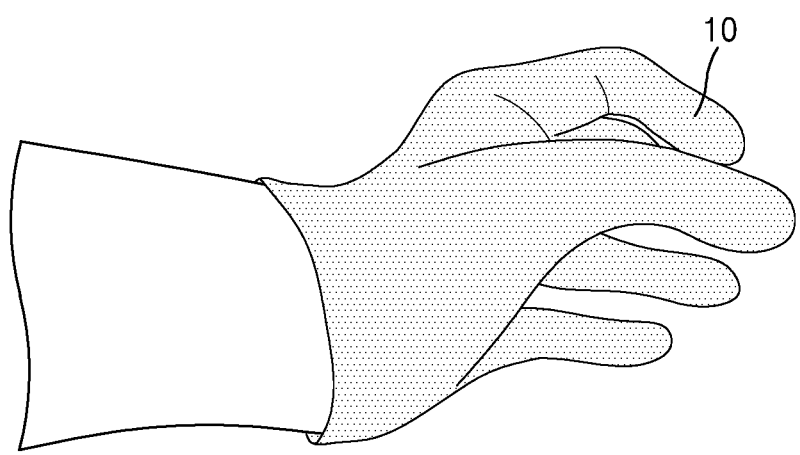
FIG. 7B is a schematic diagram of a user wearing a haptic glove apparatus in a grab display mode according to one or more example embodiments of the disclosure.
Figure 7C:
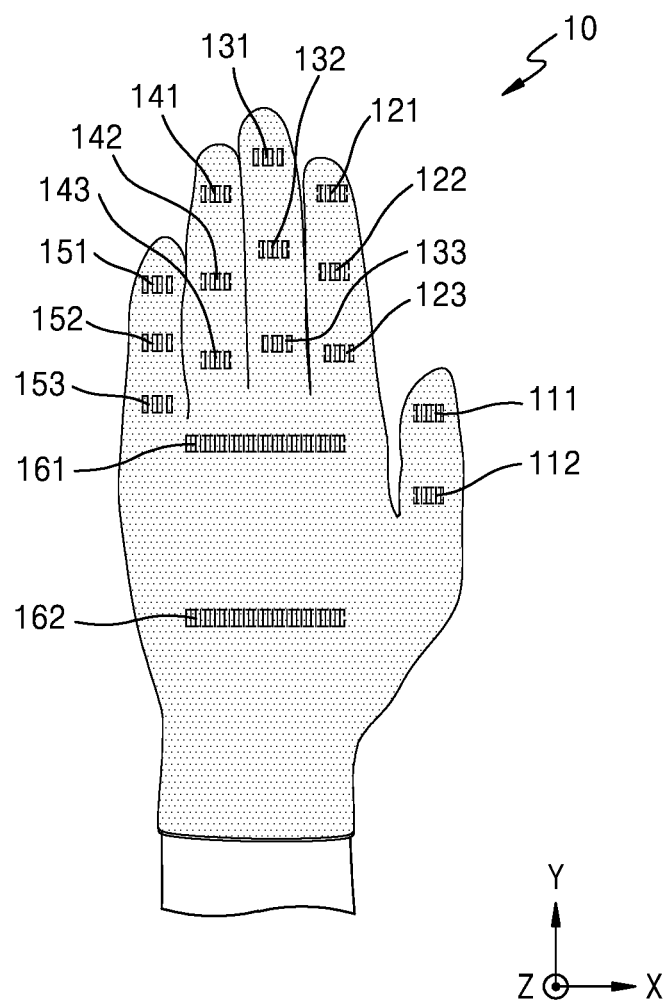
FIG. 7C is a plan view of a haptic glove apparatus in which an actuator is displayed according to one or more example embodiments of the disclosure.

FIG. 7A is a schematic diagram of a display displaying a grab display mode according to one or more example embodiments of the disclosure. FIG. 7B is a schematic diagram of a user wearing a haptic glove apparatus in a grab display mode according to one or more example embodiments of the disclosure. FIG. 7C is a plan view of a haptic glove apparatus in which an actuator is displayed according to one or more example embodiments of the disclosure.

Referring to FIG. 7A, the display device 20 according to an example embodiment may display, on the display 21, content for a virtual environment including at least one of virtual reality, augmented reality, and mixed reality. For example, the content for virtual reality may be a grab display mode 22 in which an object (for example, an apple) is held in a hand, and while the grab display mode 22 is displayed on the display 21, information about at least a portion of the content may be transmitted to the processor 60. The processor 60 may operate one or more actuators 100 in the haptic glove apparatus 10 by using information about at least a portion of received content.

Referring to FIGS. 7B and 7C, a user may take a shape of holding a certain object in his hand according to content for virtual reality displayed on the display 21, for example, the grab display mode 22. In this case, the haptic glove apparatus 10 according to an example embodiment may be worn on the user's hand. The processor 60 may allow a user to perceive a virtual sense of touch like in holding an object in a hand by operating one or more actuators 100 in the haptic glove apparatus 10 by using information about at least a portion of the received content.

When content in which the user holds an apple is provided on the display 21 according to the grab display mode 22 according to an example, the processor 60 may drive the actuator 100 disposed at a touch position in a process of holding the apple. For example, when the (1-1)th finger joint portion 211 and the (1-2)th finger joint portion 212, the (2-1)th finger joint portion 221 to the (2-3)th finger joint portion 223, the (3-1)th finger joint portion 231 to the (3-3)th finger joint portion 233, the (4-1)th finger joint portion 241 to the (4-3)th finger joint portion 243, the (5-1)th finger joint portion 251 to the (5-3)th finger joint portion 253, the upper palm cover portion 261 and the lower palm cover portion 262 are touched in the process of holding the apple, the processor 60 may drive the (1-1)th actuator 111 and the (1-2)th actuator 112, the (2-1)th actuator 121 to the (2-3)th actuator 123, the (3-1)th actuator 131 to the (3-3)th actuator 133, the (4-1)th actuator 141 to the (4-3)th actuator 143, the (5-1)th actuator 151 to the (5-3)th actuator 153, and the (6-1)th actuator 161 and the (6-2)th actuator 162, which are disposed in the position. Accordingly, the user may experience a virtual sense of touch like holding an actual apple in his hand.

Figure 8A:
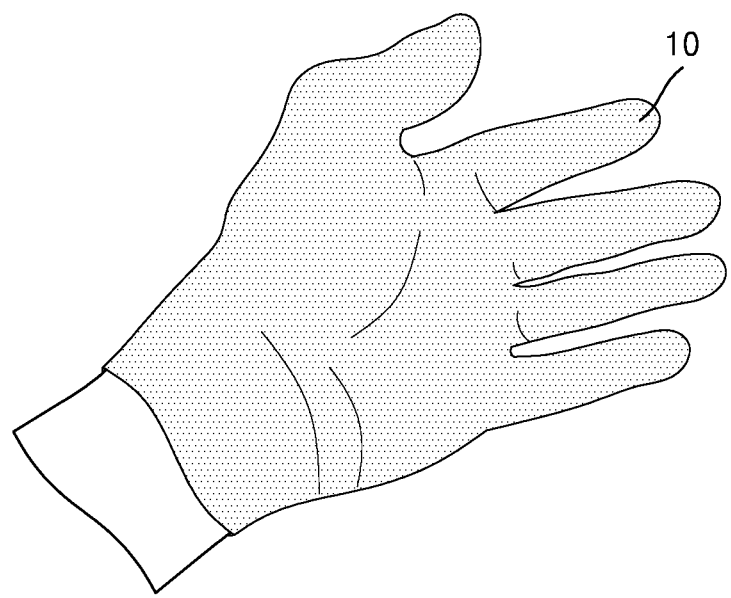
FIG. 8A is a schematic diagram of a user wearing a haptic glove apparatus in a palming display mode according to one or more example embodiments of the disclosure.
Figure 8B:
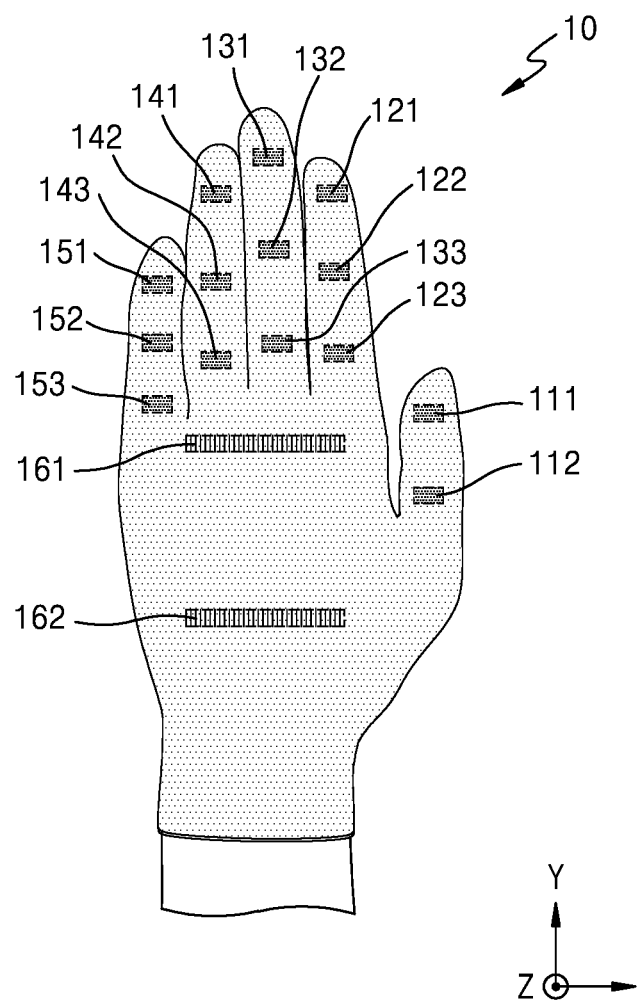
FIG. 8B is a plan view of a haptic glove apparatus in which an actuator is displayed according to one or more example embodiments of the disclosure.
Figure 8C:
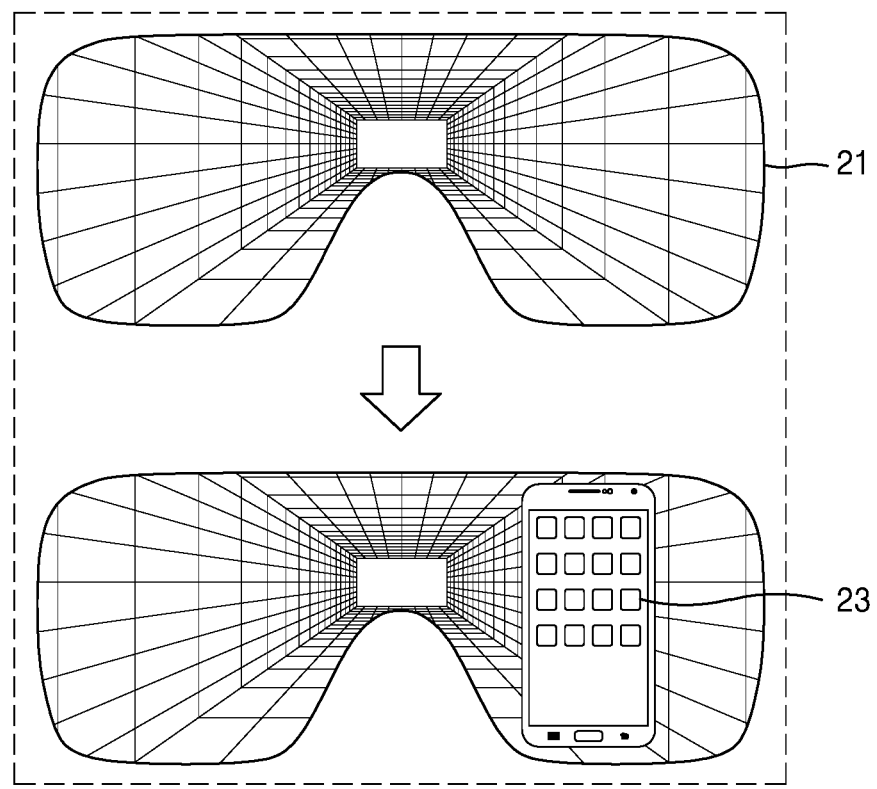
FIG. 8C is a schematic diagram of a display displaying a palming display mode according to one or more example embodiments of the disclosure.

FIG. 8A is a schematic diagram of a user wearing a haptic glove apparatus in a palming display mode according to one or more example embodiments of the disclosure. FIG. 8B is a plan view of a haptic glove apparatus in which an actuator is displayed according to one or more example embodiments of the disclosure. FIG. 8C is a schematic diagram of a display displaying a palming display mode according to one or more example embodiments of the disclosure.

Referring to FIGS. 8A and 8B, a user may take a shape of opening a hand according to content for virtual reality, for example, a palming display mode 23 shown in FIG. 8C. In this case, the haptic glove apparatus 10 according to an example may be worn on the user's hand. As the user performs the act of opening a hand, a (6-1)th actuator 161 and a (6-2)th actuator 162 respectively disposed on the upper palm cover portion 261 and the lower palm cover portion 262 may receive pressure and be deformed. In this case, the driving force applying portion 101, for example, an SMA element, included in the (6-1)th actuator 161 and the (6-2)th actuator 162 may be deformed to expand. The processor 60 may detect a change in driving current due to the deformation of the driving force applying portion 101, and the processor 60 may operate the display device 20 by using information about the change in driving current.

Referring to FIG. 8C, the display device 20 according to an example embodiment may display content for virtual reality, for example, the palming display mode 23 in which a certain manual appears, on the display 21. Accordingly, the user may experience a virtual view that changes according to the deformation of the user's hand.

Figure 9A:
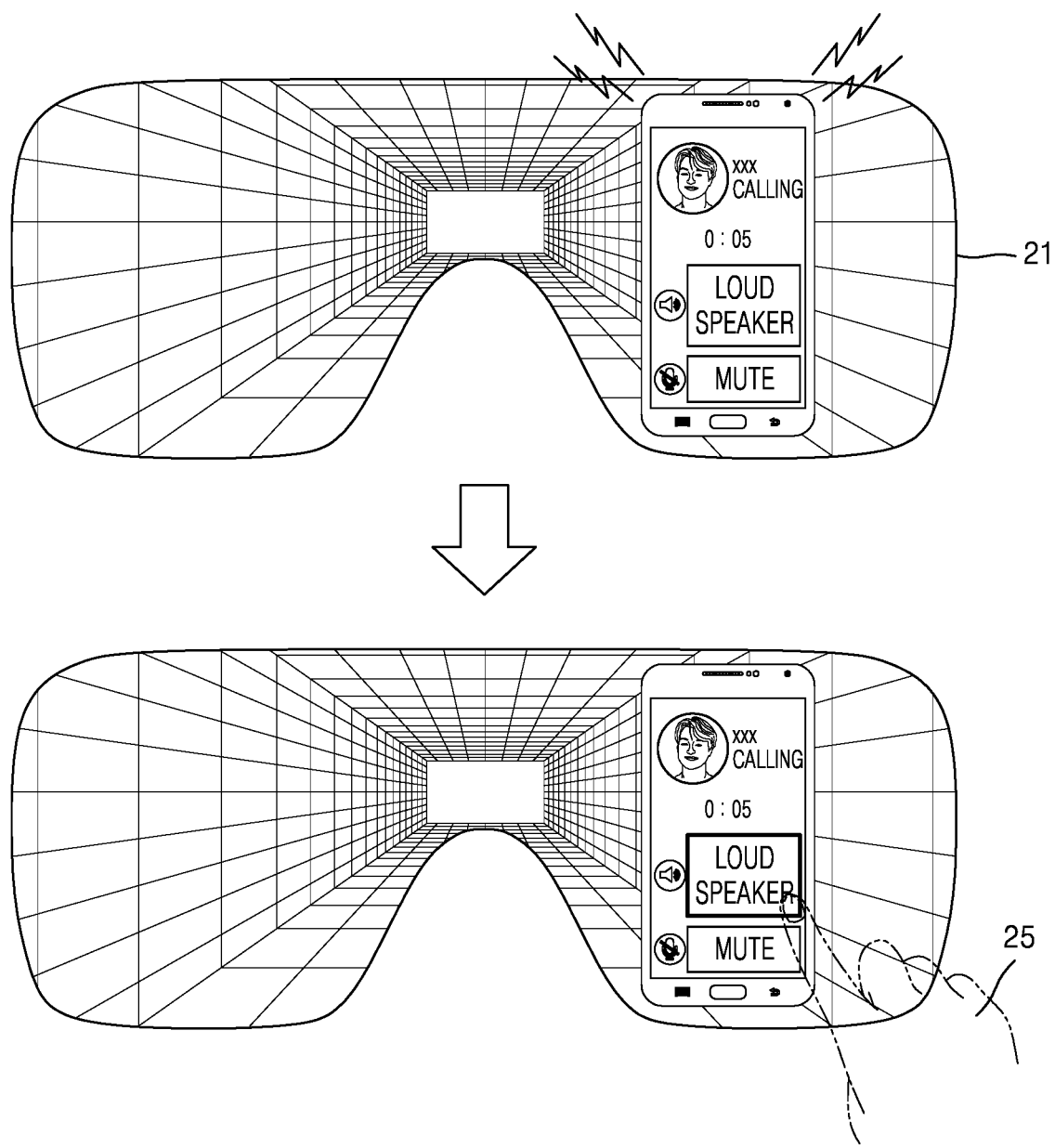
FIG. 9A is a schematic diagram of a display displaying a pointing display mode according to one or more example embodiments of the disclosure.
Figure 9B:
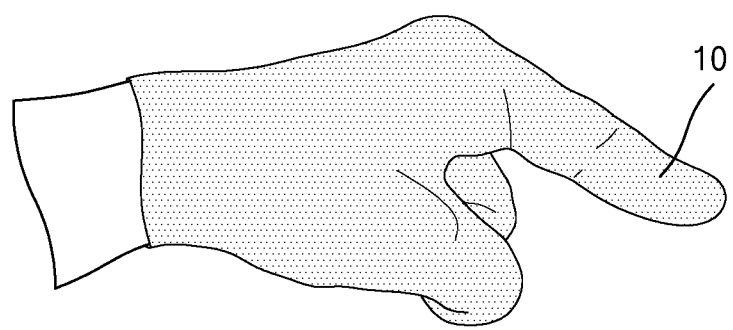
FIG. 9B is a schematic diagram of a user wearing a haptic glove apparatus in a pointing display mode according to one or more example embodiments of the disclosure.
Figure 9C:
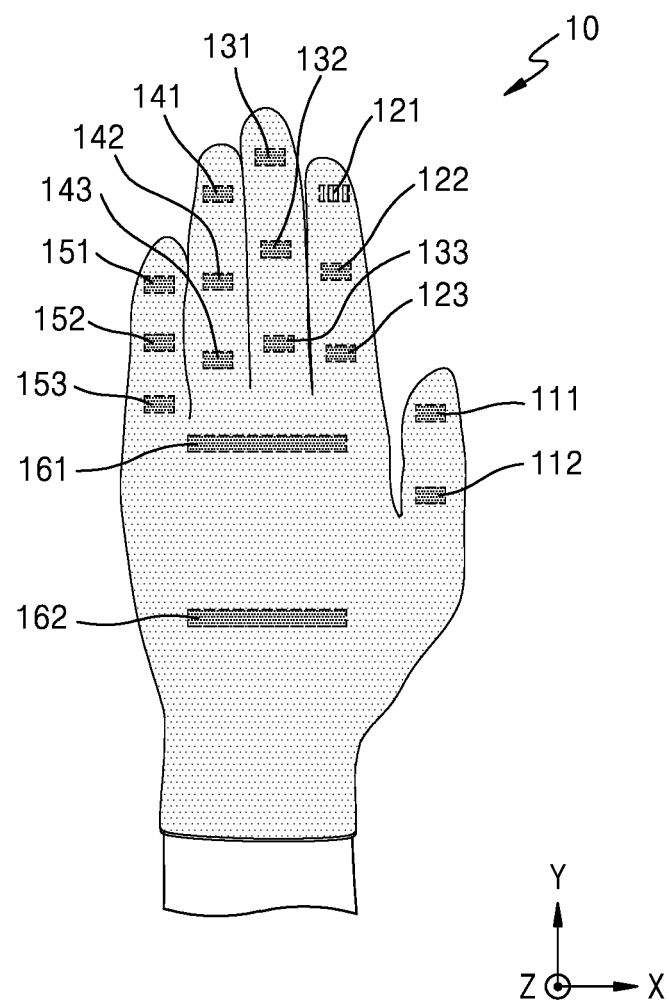
FIG. 9C is a plan view of a haptic glove apparatus in which an actuator is displayed according to one or more example embodiments of the disclosure.

FIG. 9A is a schematic diagram of a display displaying a pointing display mode according to one or more example embodiments of the disclosure. FIG. 9B is a schematic diagram of a user wearing a haptic glove apparatus in a pointing display mode according to one or more example embodiments of the disclosure. FIG. 9C is a plan view of a haptic glove apparatus in which an actuator is displayed according to one or more example embodiments of the disclosure.

Referring to FIG. 9A, the display device 20 according to an example embodiment may display, on the display 21, content for virtual reality, for example, a pointing display mode 25 for selecting a manual. The display device 20 may display the pointing display mode 25 on the display 21 and transmit information about at least a portion of the content to the processor 60. The processor 60 may operate one or more actuators 100 in the haptic glove apparatus 10 by using the information about at least a portion of the content.

Referring to FIGS. 9B and 9C, a user may take a shape of selecting a manual by using an index finger according to content for virtual reality displayed on the display 21, for example, the pointing display mode 25. In this case, the haptic glove apparatus 10 according to an example may be worn on the user's hand. The processor 60 may allow a user to perceive a virtual sense of touch like in holding an object in a hand by operating one or more actuators 100 in the haptic glove apparatus 10 by using the information about at least a portion of the content.

When content in which a manual appears is provided on the display 21 according to the pointing display mode 25 according to an example, the processor 60 may drive the actuator 100 disposed at a touch position in a process of selecting the manual by using a finger. For example, when the (2-1)th finger joint portion 221 is touched in the process of selecting the manual by using a finger, the processor 60 may drive the (2-1)th actuator 121 disposed at the position. Accordingly, the user may experience a virtual sense of touch, such as selecting a manual by using an actual finger.

A haptic glove apparatus according to an example embodiment and a virtual reality apparatus including the same may provide a haptic glove apparatus including a miniaturized actuator and a virtual reality apparatus including the same.

In addition, a haptic glove apparatus according to an example embodiment and a virtual reality apparatus including the same may provide a haptic glove apparatus including an actuator applying various pressures and a virtual reality apparatus including the same.

In addition, a haptic glove apparatus according to an example embodiment and a virtual reality apparatus including the same may provide a haptic glove apparatus implementing various senses of touch and a virtual reality apparatus including the same.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A haptic glove apparatus comprising:
  a glove-shaped base portion; and
  at least one actuator provided on the glove-shaped base portion,
  wherein the at least one actuator comprises:
    a first portion extending in a first direction and configured to expand or contract in the first direction; and
    an second portion provided to surround the first portion of the at least one actuator and configured to expand or contract in a second direction perpendicular to the first direction based on an expansion or a contraction of the first portion,
    wherein the second portion has a cross-sectional shape in the second direction having a first height at a center of the second portion, the first height being greater than a second height in the second direction at any location within the second portion other than the center of the second portion.

2. The haptic glove apparatus of claim 1,
wherein the first portion of the at least one actuator is a driving force applying portion that comprises a shape memory alloy.

3. The haptic glove apparatus of claim 1,
wherein the second portion of the at least one actuator is an elastic support portion.

4. The haptic glove apparatus of claim 1,
wherein the glove-shaped base portion comprises a first finger cover portion, a second finger cover portion, a third finger cover portion, a fourth finger cover portion, and a fifth finger cover portion, and a palm cover portion connected to each of the first finger cover portion, the second finger cover portion, the third finger cover portion, the fourth finger cover portion, and the fifth finger cover portion, and
wherein the at least one actuator comprises a plurality of actuators, wherein the plurality of actuators are provided on at least one of the first finger cover portion, the second finger cover portion, the third finger cover portion, the fourth finger cover portion, and the fifth finger cover portion and the palm cover portion.

5. The haptic glove apparatus of claim 4,
wherein the first finger cover portion comprises a first first finger joint portion and a second first finger joint portion, which are provided with a certain interval therebetween in one direction, and
wherein the plurality of actuators are provided on at least one of the first first finger joint portion and the second first finger joint portion.

6. The haptic glove apparatus of claim 4,
wherein the second finger cover portion comprises a first second finger joint portion, a second second finger joint portion, and a third second finger joint portion, which are provided with a certain interval therebetween in one direction,
the third finger cover portion comprises a first third finger joint portion, a second third finger joint portion, and a third third finger joint portion, which are disposed with a certain interval therebetween in one direction,
the fourth finger cover portion comprises a first fourth finger joint portion, a second fourth finger joint portion, and a third fourth finger joint portion, which are provided with a certain interval therebetween in one direction, and
the fifth finger cover portion comprises a first fifth finger joint portion, a second fifth finger joint portion, and a third fifth finger joint portion, which are disposed with a certain interval therebetween in one direction, and
wherein the plurality of actuators are provided on at least one of the first second finger joint portion, second second finger joint portion, the third second finger joint portion, the first third finger joint portion, second third finger joint portion, the third third finger joint portion, the first fourth finger joint portion, second fourth finger joint portion, the third fourth finger joint portion, and the first fifth finger joint portion, second fifth finger joint portion, and the third fifth finger joint portion.

7. The haptic glove apparatus of claim 4,
wherein the palm cover portion comprises an upper palm cover portion adjacent to the first finger cover portion, the second finger cover portion, the third finger cover portion, the fourth finger cover portion, and the fifth finger cover portion and a lower palm cover portion disposed adjacent to the upper palm cover portion, and
wherein the plurality of actuators are provided on at least one of the upper palm cover portion and the lower palm cover portion.

8. The haptic glove apparatus of claim 1,
wherein the at least one actuator comprises a plurality of actuators that are aligned in one direction with a certain interval therebetween.

9. The haptic glove apparatus of claim 1, further comprising a processor configured to control a driving force applied by the first portion of the at least one actuator.

10. The haptic glove apparatus of claim 9,
wherein a height of the second portion of the at least one actuator expanding or contracting in the second direction is changed according to a driving signal applied by the processor.

11. The haptic glove apparatus of claim 1, wherein the second portion of the at least one actuator has an elliptical cross-sectional shape.

12. The haptic glove apparatus of claim 1, wherein the base portion comprising a glove-shaped outer layer skin and a glove-shaped inner layer skin, and
wherein the at least one actuator is provided between the glove-shaped outer layer skin and the glove-shaped inner layer skin.

13. A virtual reality apparatus comprising:
a display device configured to display a plurality of display modes; and
a haptic glove apparatus comprising a glove-shaped base portion and at least one actuator provided on the glove-shaped base portion,
wherein the at least one actuator comprises:
a first portion extending in a first direction and configured to expand or contract in the first direction; and
an second portion provided to surround the first portion of the at least one actuator and configured to expand or contract in a second direction perpendicular to the first direction based on an expansion or a contraction of the first portion,
wherein the at least one actuator included in the haptic glove apparatus is configured to operate according to the plurality of display modes displayed on the display device,
wherein the second portion has a cross-sectional shape in the second direction having a first height at a center of the second portion, the first height being greater than a second height in the second direction at any location within the second portion other than the center of the second portion.

14. The virtual reality apparatus of claim 13,
wherein the display device comprises an augmented reality glass or a virtual reality glass.

15. The virtual reality apparatus of claim 13,
wherein the glove-shaped base portion comprises a first finger cover portion, a second finger cover portion, a third finger cover portion, a fourth finger cover portion, and a fifth finger cover portion, and a palm cover portion connected to the first finger cover portion, the second finger cover portion, the third finger cover portion, the fourth finger cover portion, and the fifth finger cover portion, and
wherein the at least one actuator comprises a plurality of actuators, wherein the plurality of actuators are provided on at least one of the first finger cover portion, the second finger cover portion, the third finger cover portion, the fourth finger cover portion, and the fifth finger cover portion and the palm cover portion.

16. The virtual reality apparatus of claim 15,
wherein the first finger cover portion comprises a first first finger joint portion and a second first finger joint portion, which are provided with a certain interval therebetween in one direction, and
wherein the plurality of actuators are provided on at least one of the first first finger joint portion and the second first finger joint portion.

17. The virtual reality apparatus of claim 16,
wherein the second finger cover portion comprises a first second finger joint portion, a second second finger joint portion, and a third second finger joint portion, which are provided with a certain interval therebetween in one direction,
the third finger cover portion comprises a first third finger joint portion, a second third finger joint portion, and a third third finger joint portion, which are disposed with a certain interval therebetween in one direction,
the fourth finger cover portion comprises a first fourth finger joint portion, a second fourth finger joint portion, and a third fourth finger joint portion, which are provided with a certain interval therebetween in one direction, and
the fifth finger cover portion comprises a first fifth finger joint portion, a second fifth finger joint portion, and a third fifth finger joint portion, which are disposed with a certain interval therebetween in one direction, and
wherein the plurality of actuators are provided on at least one of the first second finger joint portion, second second finger joint portion, the third second finger joint portion, the first third finger joint portion, second third finger joint portion, the third third finger joint portion, the first fourth finger joint portion, second fourth finger joint portion, the third fourth finger joint portion, and the first fifth finger joint portion, second fifth finger joint portion, and the third fifth finger joint portion.

18. The virtual reality apparatus of claim 17,
wherein the palm cover portion comprises an upper palm cover portion adjacent to the first finger cover portion, the second finger cover portion, the third finger cover portion, the fourth finger cover portion, and the fifth finger cover portion and a lower palm cover portion disposed adjacent to the upper palm cover portion, and
wherein the plurality of actuators are provided on at least one of the upper palm cover portion and the lower palm cover portion.

19. The virtual reality apparatus of claim 18,
wherein the plurality of display modes comprise at least one of a grab display mode, a palming display mode, and a point display mode.

20. The virtual reality apparatus of claim 19,
wherein the display device is configured to display the grab display mode, and
wherein the plurality of actuators provided on the first first finger joint portion, the second first finger joint portion, the first second finger joint portion, the second second finger joint portion, the third second finger joint portion, the first third finger joint portion, the second third finger joint portion, the third third finger joint portion, the first fourth finger joint portion, the second fourth finger joint portion, the third fourth finger joint portion, the first fifth finger joint portion, the second fifth finger joint portion, the third fifth finger joint portion, the upper palm cover portion and the lower palm cover portion, are configured to operate based on the grab display mode.

21. The virtual reality apparatus of claim 19, wherein the plurality of actuators provided on the upper palm cover portion and the lower palm cover portion are deformed, and the display device is configured to display the palming display mode.

22. The virtual reality apparatus of claim 17, wherein the display device is configured to display a point display mode, and an actuator provided on the first second finger joint portion operates based on the point display mode.

23. A wearable haptic apparatus comprising:

a base portion configured to be worn by a user; and one or more actuators provided on the base portion, each of the one or more actuators comprising:
  a first portion extending in a first direction and configured to expand or contract in the first direction; and
  a second portion connected to the first portion and surrounding the first portion, wherein the second portion is configured to expand or contract in a second direction perpendicular to the first direction based on an expansion or a contraction of the first portion,
  wherein the second portion has a cross-sectional shape in the second direction having a first height at a center of the second portion, the first height being greater than a second height in the second direction at any location within the second portion other than the center of the second portion.

24. The wearable haptic apparatus of claim 23, wherein the base portion is further configured to conform to a body part of the user.

* * * * *